Figure 5:
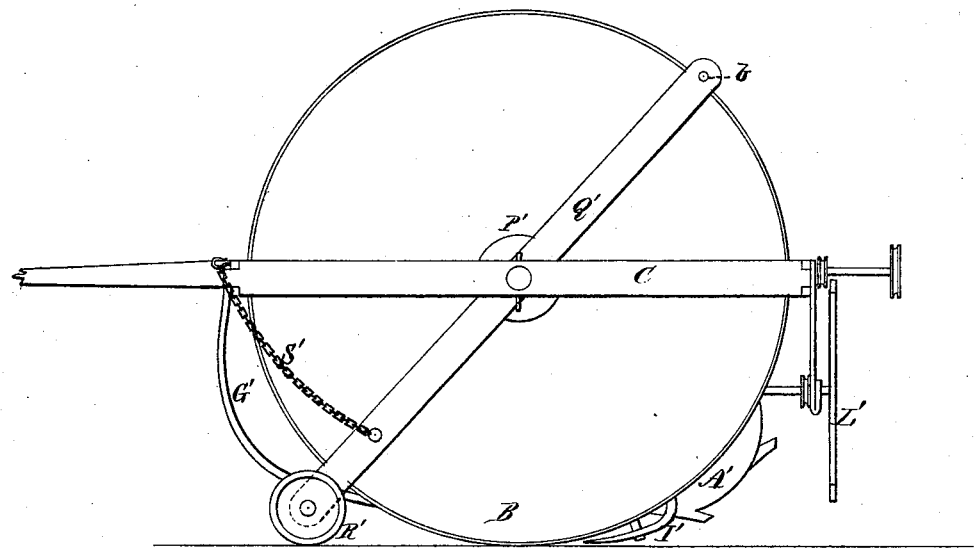

3 Sheets--Sheet 1.
S. MARTIN.
Improvement in Combined Seeders and Cultivators.
No. 132,845. Patented Nov. 5, 1872.
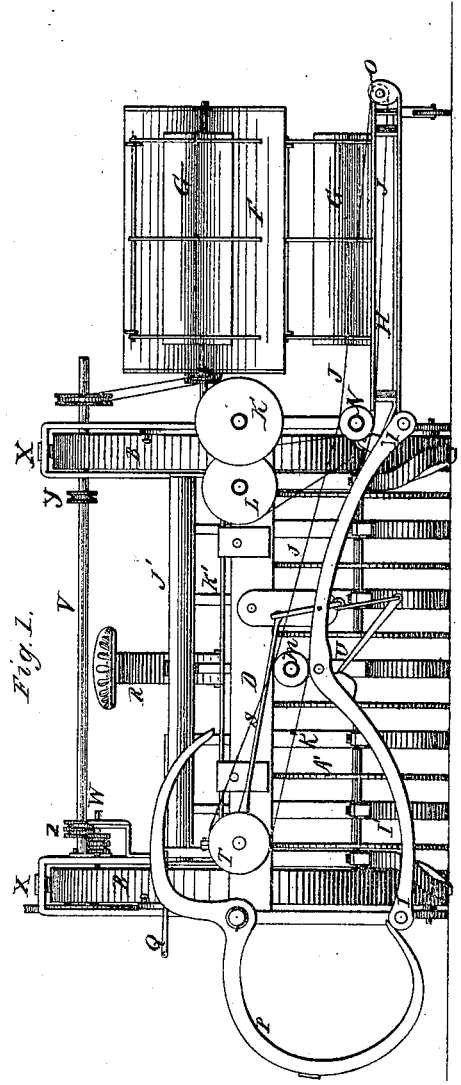
Witnesses
Inventor
Samuel Martin
Per
C. H. Watson & Co
Attys.

3 Sheets--Sheet 2.
S. MARTIN.
Improvement in Combined Seeders and Cultivators.
No. 132,845.
Patented Nov. 5, 1872.
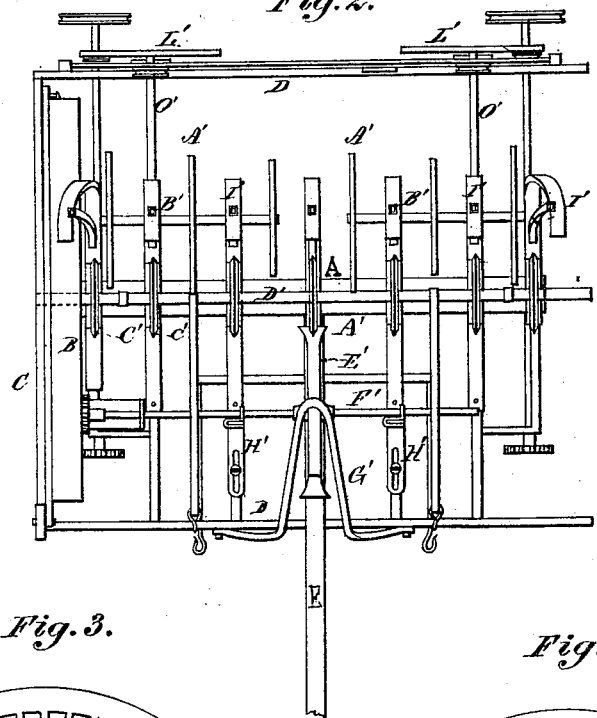
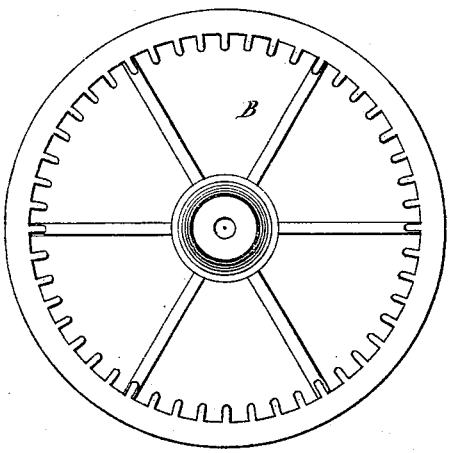
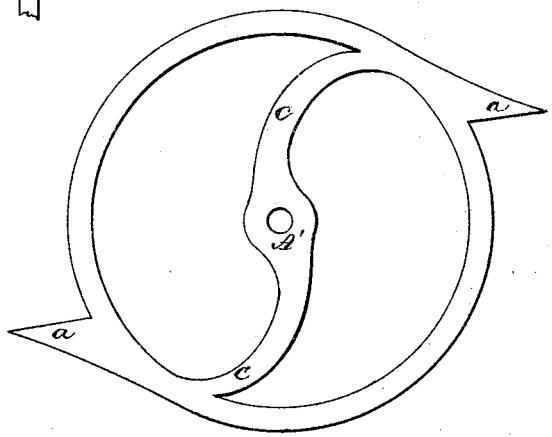

3 Sheets--Sheet 3.

S. MARTIN.

Improvement in Combined Seeders and Cultivators.

No. 132,845.  Patented Nov. 5, 1872.

Witnesses  
Inventor  
Samuel Martin

UNITED STATES PATENT OFFICE.

SAMUEL MARTIN, OF KNOBNOSTER, MISSOURI.

IMPROVEMENT IN COMBINED SEEDERS AND CULTIVATORS.

Specification forming part of Letters Patent No. 132,845, dated November 5, 1872.

*To all whom it may concern:*

Be it known that I, SAMUEL MARTIN, of Knobnoster, in the county of Johnson and State of Missouri, have invented certain new and useful Improvements in Agricultural Implement; and I do hereby declare that the following is a full, clear, and exact description thereof, that will enable others skilled in the art to which it appertains to make and use the same, reference being had to the accompanying drawing and to the letters of reference marked thereon, which form a part of this specification.

My invention relates to a combined agricultural implement to be known as "The Shepherd's Yeoman;" and has for its object to combine with one pair of wheels and axle devices to be interchanged so that the same wheels and axle will support the necessary devices to make the implement serve the purpose of pulverizing the ground, planting, cultivating, stalk-chopping, potato or pea-nut ridging, cotton chopping, and reaping and binding, or as a mower in the meadow.

By this machine no scar of implement or track of wheel, beast, or man will be left on the broken ground. All fertilizers, stalks, weeds, &c., will be cut into short pieces and evenly mixed with the soil. All moles, mice, grubs, and vast numbers of insects and larvæ will be destroyed by the action of the machine. The soil will be reduced to a highly-pulverized condition and left uniformly even. No choking, clogging, or unsteady motion will be perceptible in the forward movement of the machine. At the same time the ground is broken it can, with this machine, be planted to corn, cane, cotton, or peas, &c., or drilled with wheat, rye, and oats with exact precision, deep or shallow, thick or thin, as desired, and all without change save a slight regulation. A slight change enables cultivation to go on until the crop is made, the tillage being perfect. The same machine, by simple attachments, adds a fine reaper, corn-harvester, or mower. Small grain of all kinds is harvested by reeling, reaping, and raking the straw evenly and compactly together into a receiver until one or more shocks accumulate, when it is instantly and easily thrown to the ground (or any of the known binders may be attached) by the action of the machine upon the freshly-broken and seeded earth. Harvesting, breaking, and seeding may be accomplished at the same moment, and thus prevent the maturing of obnoxious weeds. The field is kept employed in vegetating fruitful crops without intermission. When the work of harvesting, breaking, and seeding is to be accomplished at the same time by the machine it is estimated that the power of four animals will be required, but not necessarily more than one person besides the driver will be required to manipulate the machine.

With two horses the machine will break the earth and raise ridges to the height required for root crops, and by a simple attachment accurately place the plants on the tops of the ridges for setting; and it consists in so combining and arranging the devices above mentioned, and in the construction of the same, that all can be readily attached and detached, as desired, to the one frame, thereby saving the expense of various machines and room to store the same when not in use, as hereinafter more fully described and pointed out by the claims.

Figure 6:
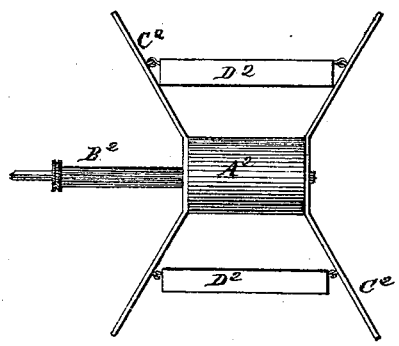

Referring to the drawing, Figure 1 represents a rear view of an implement embodying my invention, with reaper, &c., attached; Fig. 2 represents a bottom view of the same with reaper detached and the ridgers, pulverizers, stalk-choppers attached; Fig. 3 represents an inside view of one of the drive or traction wheels; Fig. 4 represents a side elevation of one of the pulverizers; Fig. 5 is a side elevation; and Fig. 6 represents a reel to be used in harvesting corn, as hereinafter more fully described.

A represents the axle of the machine, having the wheels B B. upon each end in the usual manner. C represents the side bars of the machine, forming a part of the frame, and are supported in the center of the machine by the axle A, which extends outside of the wheels B B. D D represent transverse bars forming the front and rear portions of the frame, being suitably connected to the side bars C. E represents the tongue of the machine, which is supported by the front transverse bar D and axle A. When the reaping attachment is desired to be used, said tongue is spliced between the axle and rear bar D, so that it will extend to and beyond the rear part of the frame to assist in supporting reaper attachment. F represents a reel, having combs G attached, serving to straighten up the grain and comb the same down on the platform H, so that it may be readily severed by the cutters in the front of the platform. When the grain is cut it falls upon the apron J, by which it is carried under the drum K and falls upon the bars in front of the brace I, where it is gathered or packed by the arms U, which have a vibrating motion through the action of the crank-shaft and connecting-rod S. The grain is forced by the arms U into the receiver P, where it is held until a sufficient quantity is gathered, when the driver can, by pressing his hand or foot upon the lever Q, let the grain fall to the ground outside of the track of the machine from the receiver. The apron is operated from the pulley T, being connected by a band to the pulley M. The cutters are operated from the pulley L, and the reel from a pulley upon the shaft V, which in turn is operated from the small pinion-shaft W, which is driven by the cogs from the inside of one of the traction-wheels B, and supported by the frame X.

This reaping attachment embraces an invention which will form the subject of a separate application, and need not be more fully described here.

$A^1$ represents revolving cutters placed upon shafts $B^1$. Said shafts are supported in suitable bearings extending downward from the frame, and may be arranged to be adjusted high or low, as desired. The shafts extend from either traction-wheel inward nearly to the center of the machine, each being driven by one of the wheels. This gives an independent motion to each set of cutters, and serves to equalize the draft when either wheel meets an obstruction. Directly under the axle is placed a series of cutters, $C^1$, which are also driven by the action of the traction-wheels, and supported by suitable frame-work from the axle. These cutters $C^1$ may be adjusted to cut deep or shallow, and by placing them directly under the axle they do not retard the motion of the machine in turning, while the cutters, when thus arranged, may be placed upon a continuous shaft, $D^1$. E' represents a stalk-cutter, which is supported by a shaft, F', supported by hangers from the frame, and power is communicated to the same directly from the traction-wheels. G' represents a guide of the form shown, supported from the front cross-bar D, the object of which is to gather the row of stalks and support the same in proper position, when they are at once severed by the revolving cutter E'. Between each of the cutters $A^1$ a drill-tooth extends downward, which is supported from the frame and bent in the usual form, and having a hollow brace through which the seed passes from the hopper J' through the conveying-tubes K', and passes to the ground through a perforation in the bottom of the drill. L' L' represent ridgers extending to the rear of the machine, being mounted upon longitudinal shafts O' O', which are driven from the traction-wheels, as shown. When this device is used to ridge the ground I propose to use an endless belt or apron, which will be driven by or from the shaft V, and extending to the rear of the machine, and being provided with buckets, in which plants are to be placed as the machine moves forward, by which means the plants will be evenly distributed along upon the top of the ridge, ready for setting.

The traction-wheels are of the construction shown in Fig. 3, having upon the inwardly and downwardly extending rim series of cogs, by which means motion is communicated to all the various working parts of the machine through the medium of the various shafts, pinions, and levers above mentioned. I prefer to form the wheels with spokes in the usual manner, and the inside of the rim should be formed upon an outward incline so as to prevent the dirt from clogging in the same. The axle A extends beyond the wheel, and is provided with a slotted washer, P', and pivoted in the side bar C. A lever, Q', fits in said washer, and extends in either direction to the outside of the wheel. At its upper end said lever is provided with a friction-roller, $b$, and at the other end with the small wheel R'. The object of this lever and wheel is to raise the machine from the ground when required, which is effected by adjusting the chain S' to a sufficient length to allow the wheel R' to come directly under the center of the traction-wheel, and held in such position by the chain S'. Each side of the machine is provided with a like device, by which means the machine is raised entirely from the ground when desired. The construction of the revolving cutters is as shown in Fig. 4, the cutters $a$ being formed from the circumference and passing back, so that the arm $c$ will receive the force of the blow when the cutters $a$ strike the ground, as said arms are in direct line to receive the force of the blow in the construction shown. $A^2$ represents a cylinder mounted upon the shaft $B^2$, and having circular heads, from which extend the arms $C^2$, between which are hinged the flies $D^2$, as shown. This device forms a reel, to be used in place of the reel F G in harvesting. When the corn-harvester is used, the corn is gathered between the arms of the reel above described, and is cut off by the saws or knives of the reaper. After passing around the field once the stalk-cutter E' shaves the stubbles off close to the ground, while the cutters $C^1$ cut the same in short pieces. The revolving pulverizers loosen up the earth which is planted or drilled by the seeder, while the corn being harvested is carried to the opposite side of the machine through the medium of the apron, drum, fingers or arms, and receiver, and deposited in bundles of any convenient size, much or little, at the option of the operator. Thus the ground is harvested, pulverized, and seeded at one operation.

Having thus fully described my invention, what I claim, and desire to secure by Letters Patent, is—

1. The combination in one machine of a harvester, stalk-chopper, cutters, pulverizer, and seed-drill, substantially as and for the purpose herein specified.

2. The axle A and wheels B in combination with the short shafts $B^1 B^1$ and pulverizers $A^1$, as and for the purpose set forth.

3. The bent guide $G'$, chopper $E'$, and shaft $F'$, arranged and operating substantially as and for the purpose herein described.

4. A series of revolving cutters, $C^1$, arranged between the chopper $E'$ and pulverizers $A^1$, and supported from a rigid frame directly beneath the axle A, as and for the purpose herein specified.

5. The lever $Q'$, in combination with the friction-roller $b$, wheels $R'$ and B, slotted washer $P'$, and chain $S'$, constructed and arranged as and for the purpose set forth.

6. The combination of the chopper $E'$, cutters $C^1$ and pulverizers $A^1$, and drills $B^1$, when arranged substantially as herein described, and for the purpose set forth.

7. The chopper $E'$, cutters $C^1$, pulverizers $A^1$, in combination with the drills $B^1$ and seeding mechanism, substantially as and for the purpose set forth.

8. The side bars C C, extending outside of the wheels B B and supported by the extension of the axle A, and combined with the tongue E and transverse bars D D, substantially as and for the purpose specified.

9. The arrangement and construction of the frame, wheels, and axle, as herein described, to receive the different devices for operation in breaking the ground, planting, and harvesting, substantially as herein described.

In testimony that I claim the foregoing I have hereunto set my hand.

SAMUEL MARTIN.

Witnesses:
　Louis D. Everhart,
　John A. Ellis.